US009223324B2

United States Patent
Xu et al.

(10) Patent No.: US 9,223,324 B2
(45) Date of Patent: Dec. 29, 2015

(54) DC VOLTAGE-LIMITING CIRCUITS AND ELECTRONIC DEVICES AND THERMOSTATS INCLUDING DC VOLTAGE-LIMITING CIRCUITS

(71) Applicant: Emerson Electric Co., St. Louis, MO (US)

(72) Inventors: Zhongliang Xu, Xi'an (CN); Liang Cao, Xi'an (CN); Cuikun Chu, Xi'an (CN); Bradley C. Zikes, Sunset Hills, MO (US)

(73) Assignee: Emerson Electric Co., St. Louis, MO (US)

( * ) Notice: Subject to any disclaimer, the term of this patent is extended or adjusted under 35 U.S.C. 154(b) by 128 days.

(21) Appl. No.: 14/271,689

(22) Filed: May 7, 2014

(65) Prior Publication Data

US 2015/0122900 A1     May 7, 2015

(30) Foreign Application Priority Data

Nov. 6, 2013  (CN) .................... 2013 2 0699355 U (51) Int. Cl.
*H03K 5/08* (2006.01)
*G05D 23/19* (2006.01)
*H02J 1/00* (2006.01)

(52) U.S. Cl.
CPC .. *G05D 23/19* (2013.01); *H02J 1/00* (2013.01)

(58) Field of Classification Search
CPC ............ H03K 17/063; H03K 17/0822; H03K 17/302; H02M 1/36
See application file for complete search history.

(56) References Cited

U.S. PATENT DOCUMENTS

| | | | |
|---|---|---|---|
| 8,018,696 B2 | 9/2011 | Ahrendt | |
| 2014/0192564 A1* | 7/2014 | Tang | H02M 3/33592 363/21.14 |

* cited by examiner

*Primary Examiner* — Sibin Chen
(74) *Attorney, Agent, or Firm* — Harness, Dickey & Pierce, P.L.C.

(57) ABSTRACT

A DC voltage-limiting circuit generally includes first, second, and third transistors. The first transistor is connected between a voltage input terminal and a voltage output terminal. The first transistor has a collector connected to the voltage input terminal, an emitter connected to the voltage output terminal, and a base connected to the voltage input terminal via a first resistor. The second transistor has a base connected to the voltage input terminal via a first voltage regulator and a second resistor, a collector connected to the base of the first transistor, and an emitter connected to the voltage output terminal. The third transistor has a collector connected to the base of the first transistor via a third resistor, an emitter grounded, and a base connected to the voltage output terminal via a second voltage regulator and a fourth resistor.

20 Claims, 5 Drawing Sheets

DC VOLTAGE-LIMITING CIRCUITS AND ELECTRONIC DEVICES AND THERMOSTATS INCLUDING DC VOLTAGE-LIMITING CIRCUITS

CROSS-REFERENCE TO RELATED APPLICATION

This application claims the benefit and priority of Chinese Utility Model Patent Application No. 201320699355.5 filed Nov. 6, 2013. The entire disclosure of the above application is incorporated herein by reference.

FIELD

The present disclosure relates to DC voltage-limiting circuits. The present disclosure also relates to electronic devices and thermostats including DC voltage-limiting circuits.

BACKGROUND

This section provides background information related to the present disclosure which is not necessarily prior art.

An electronic device (e.g. a thermostat, etc.) conventionally contains a voltage step-down converter circuit (a BUCK circuit) providing a voltage to the electronic device or module such that the electronic device has a sufficient electricity supply. As the technology advances, some wireless communication techniques are being integrated into a thermostat, e.g., a Wi-Fi function module, etc. But a module with Wi-Fi functions has a large electricity consumption, which requires a DC/AC (Direct Current/Alternating Current) power stealing mode for electricity supply. Therefore, the inventors hereof have recognized that it would be desirable to provide the BUCK circuit with a capacitor of a high capacitance sufficient to store enough electricity to provide a large voltage to the BUCK circuit.

The size of a capacitor is proportional to its capacitance; hence the size of the high-capacitance capacitor would be large. Based on the mechanical design, however, the space for such a high-capacitance capacitor is limited. In order to keep the capacitance, the capacitor of a relatively small size and a low rated voltage is used. Therefore, the inventors hereof have recognized that it would be desirable to design a DC voltage-limiting circuit to limit the input voltage of the capacitor of a low rated voltage. In other words, in order to provide sufficient electricity supply to the electronic device, it is desired to add a large-size capacitor before the BUCK circuit. Due to limited space on the PCB (Printed Circuit Board), it is desired to design a DC voltage-limiting circuit and a small-size capacitor to reduce the large size of the capacitor.

Existing voltage-limiting circuits use a voltage dividing resistor based method or a voltage regulator diode based method. Both methods have many disadvantages associated therewith. For example, the voltage dividing resistor based method has a high electricity loss and cannot provide a variable input voltage. And, for example, the voltage regulator diode based method provides a discontinuous voltage, and its output capacity depends on the dissipation power Pw of the voltage regulator diode, which is low. The advantages and disadvantages and application conditions of the methods are shown in the table below.

| Voltage-limiting Method | Advantages | Disadvantages | Application Scenarios |
|---|---|---|---|
| Voltage dividing resistor | 1. Cheap 2. Convenient | 1. High current, thus high electricity consumption by the resistor 2. Does not support variable input voltage | Used in constant input voltage conditions |
| Voltage regulator diode | 1. Cheap 2. Convenient | 1. Discontinuous voltage 2. Output capacity depends on dissipation power Pw of the voltage regulator diode, which is low | 1. Surge protection 2. Over voltage protection 3. Voltage regulators in series 4. Low power supply |

SUMMARY

This section provides a general summary of the disclosure, and is not a comprehensive disclosure of its full scope or all of its features.

According to various aspects, exemplary embodiments are disclosed of DC voltage-limiting circuits. Also disclosed are electronic devices and thermostats including such DC voltage-limiting circuits. In an exemplary embodiment, a DC voltage-limiting circuit generally includes first, second, and third transistors. The first transistor is connected between a voltage input terminal and a voltage output terminal. The first transistor has a collector connected to the voltage input terminal, an emitter connected to the voltage output terminal, and a base connected to the voltage input terminal via a first resistor. The second transistor has a base connected to the voltage input terminal via a first voltage regulator and a second resistor, a collector connected to the base of the first transistor, and an emitter connected to the voltage output terminal. The third transistor, has a collector connected to the base of the first transistor via a third resistor, an emitter grounded, and a base connected to the voltage output terminal via a second voltage regulator and a fourth resistor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Exemplary embodiments of the present disclosure provide DC voltage-limiting circuits. In an exemplary embodiment, a DC voltage-limiting circuit generally includes first, second, and third transistors. The first transistor is connected between a voltage input terminal and a voltage output terminal. The first transistor has a collector connected to the voltage input terminal, an emitter connected to the voltage output terminal, and a base connected to the voltage input terminal via a first resistor. The second transistor has a base connected to the voltage input terminal via a first voltage regulator and a second resistor. The second transistor also includes a collector connected to the base of the first transistor and an emitter connected to the voltage output terminal. The third transistor has a collector connected to the base of the first transistor via a third resistor, an emitter grounded, and a base connected to the voltage output terminal via a second voltage regulator and a fourth resistor.

Further, the first resistor may include at least two sub-resistors. A sum of the resistances of the sub-resistors may be equal to the resistance of the first resistor. Preferably, the first resistor includes four sub-resistors connected in series. The DC voltage-limiting circuit may further include a first capacitor connected between the voltage input terminal and ground, for filtering.

Exemplary embodiments of the present disclosure also provide an electronic device (e.g., a thermostat, etc.) including the DC voltage-limiting circuit described above. The electronic device also includes a second capacitor connected between the voltage output terminal and ground.

The electronic device may further include a bridge rectifier before the DC voltage-limiting circuit and a BUCK circuit after the DC voltage-limiting circuit. The BUCK circuit is a voltage step-down converter circuit. The bridge rectifier has a voltage output terminal being the voltage input terminal of the DC voltage-limiting circuit. The BUCK circuit has a voltage input terminal being the voltage output terminal of the DC voltage-limiting circuit.

The bridge rectifier may further include a first terminal and a second terminal. The first terminal is connected to a live wire. The second terminal is connected to a neutral wire. Further, the second terminal is connected to the neutral wire via two branches (first and second branches). One branch (the first branch) includes the second terminal connecting to the neutral wire. The other or second branch includes the second terminal connecting to the neutral wire via a load. The electronic device described above may be a thermostat.

Furthermore, exemplary embodiments herein also provide a thermostat. The thermostat generally includes the DC voltage-limiting circuit described above. The thermostat also includes a bridge rectifier including a first terminal and a second terminal. The first terminal is connected to a live wire. The second terminal is connected to a neutral wire via two branches. One branch includes the second terminal connecting to the neutral wire. The other branch includes the second terminal connecting to the neutral wire via a load. The voltage input terminal of the DC voltage-limiting circuit may be a voltage output terminal of the bridge rectifier. A second capacitor is connected between the voltage output terminal of the DC voltage-limiting circuit and ground. A BUCK circuit includes a voltage input terminal that may be the voltage output terminal of the DC voltage-limiting circuit.

As compared with the prior art, exemplary embodiments disclosed herein may provide one or more (but not necessarily any or all) of the following beneficial effects. For example, an exemplary embodiment of the DC voltage-limiting circuit has a wide input voltage range (e.g., 25 volts of direct current (VDC) to 42 VDC, etc.) and a low power consumption.

Advantages of the DC voltage-limiting circuit according to exemplary embodiments may include: (1) adaptable to a wide input voltage, such as a DC range of 25VDC-42VDC; (2) supporting a larger voltage drop; (3) provided with fast charge and slow charge paths, suitable for high input and low input currents; (4) without high-frequency interference for the circuit, and with low noise; and/or (5) design flexibility, supporting a variety of voltage-limiting designs by changing the voltage regulator diodes.

As compared with the voltage dividing resistor based method, the DC voltage-limiting circuit provided by exemplary embodiments of the present disclosure may have the following advantages: (1) adaptable to a wide input voltage; (2) low power consumption by the circuit itself; and/or (3) design flexibility.

As compared with the voltage regulator diode based method, the DC voltage-limiting circuit provided by exemplary embodiments of the present disclosure may have the following advantages: (1) a wide input voltage; and/or (2) low power consumption by the circuit itself.

Accordingly, exemplary embodiments disclosed herein provide a DC voltage-limiting circuit used after a bridge rectifier and before a BUCK circuit. The DC voltage-limiting circuit is applicable to electronic devices, including thermostats and other controllers. Details and relevant applications of the DC voltage-limiting circuit are described below with reference to an example where it is applied to a thermostat.

Figure 1:
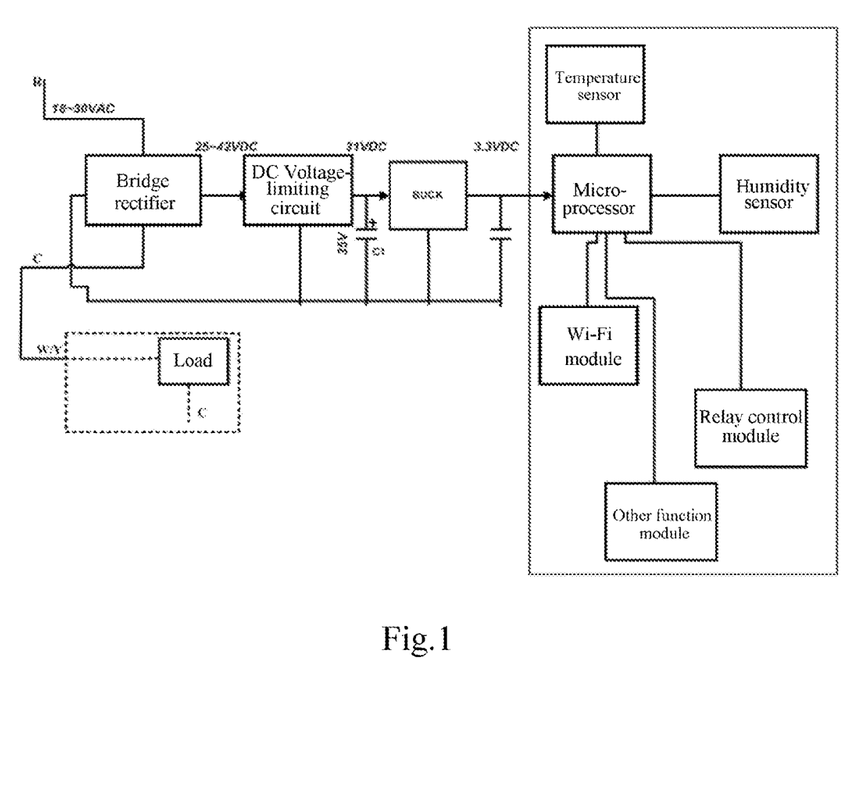
FIG. 1 is a block diagram of a thermostat including a DC voltage-limiting circuit according to an exemplary embodiment.

With reference to the figures, FIG. 1 is a block diagram of a thermostat including a DC voltage-limiting circuit according to an exemplary embodiment. In this example, the output voltage of the bridge rectifier is a wide range DC voltage ranging from 25V to 42V. In order to provide electricity consumption of the thermostat in a power stealing mode (e.g., for a Wi-Fi model, etc.), it is desired to add a high-capacitance capacitor before the BUCK circuit, where the capacitor would have a large size so that it has a high capacity to meet the wide voltage range (25VDC-42VDC). Due to limited space on the PCB, in order to keep the capacitance, a capacitor of a relatively small size and a low rated voltage may be used. Therefore, it is desired to design a DC voltage-limiting circuit and a small-size capacitor, the DC voltage-limiting circuit being used for limiting the input voltage to the small-size capacitor.

In the prior art, the bridge rectifier includes a first terminal and a second terminal, the first terminal being connected to a live wire, and the second terminal being connected to a neutral wire, and the voltage output terminal of the bridge rectifier is connected to the voltage input terminal of the DC voltage-limiting circuit. The exemplary embodiment disclosed herein differ from the prior art in that the second terminal of the bridge rectifier is connected to the neutral wire via two branches. One branch includes the second terminal connecting directly to the neutral wire. The other branch includes the second terminal connecting to the neutral wire via a load. The purpose of providing two branches for connecting the bridge rectifier to the neutral wire is to enable power supply in the power stealing mode.

The voltage output terminal of the DC voltage-limiting circuit is connected to the voltage input terminal of the BUCK circuit.

The capacitor C1 shown in FIG. 1 is the second capacitor added for providing the voltage to the BUCK circuit. The capacitor C1 is connected between the voltage output terminal of the DC voltage-limiting circuit and ground.

Figure 2:
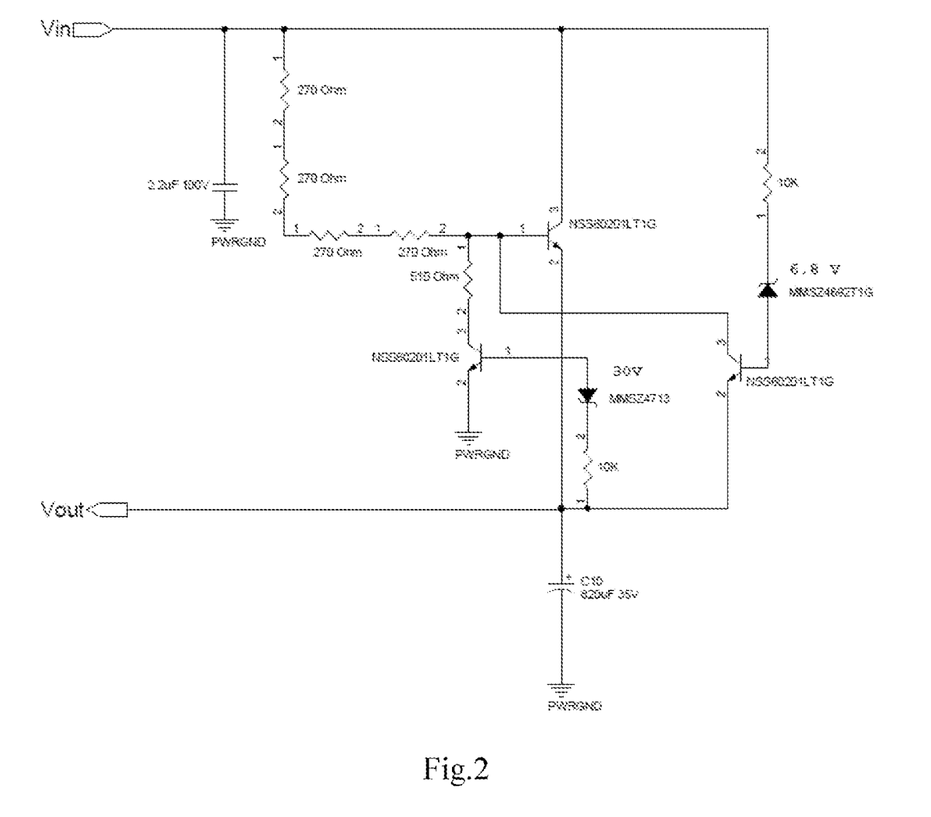
FIG. 2 is a DC voltage-limiting circuit according to an exemplary embodiment.

FIG. 2 shows details of the DC voltage-limiting circuit of FIG. 1. The DC voltage-limiting circuit includes a first transistor, a second transistor, and a third transistor. The first transistor is connected between the voltage input terminal $V_{in}$ and the voltage output terminal $V_{out}$. A first capacitor is connected between the voltage input terminal $V_{in}$ and ground PWRGND.

A collector of the first transistor is connected to the voltage input terminal $V_{in}$, and an emitter of the first transistor is connected to the voltage output terminal $V_{out}$. A base of the first transistor is connected to the voltage input terminal $V_{in}$ via four resistors connected in series (each resistor having a resistance of 270 ohms (Ω)). The four resistors may be replaced by one resistor, two resistors, three or more resistors, etc. so long as the resistance between the voltage input terminal $V_{in}$ and the base of the first transistor is constant. The solution with four resistors is preferable to the solution having only one resistor because the one resistor would have a large resistance and thus poor heat dissipation and large size, which takes up the space on the PCB.

A base of the second transistor is connected to the voltage input terminal $V_{in}$ via a first voltage regulator (e.g., MMSZ4692T1G zener diode voltage regulator with a voltage of 6.8 volts (V) as shown in FIG. 2, etc.) and a second resistor (e.g., with a resistance of 10 kiloohms (KΩ) as shown in FIG. 2, etc.). A collector of the second transistor is connected to the base of the first transistor. An emitter of the second transistor is connected to the voltage output terminal $V_{out}$.

A collector of the third transistor is connected to the base of the first transistor via a third resistor (e.g., with a resistance of 510Ω as shown in FIG. 2, etc.). An emitter of the third transistor is connected to ground PWRGND. A base of the third transistor is connected to the voltage output terminal $V_{out}$ via a second voltage regulator (e.g., MMSZ4713 zener diode voltage regulator with a voltage of 30V as shown in FIG. 2, etc.) and a fourth resistor (e.g., with a resistance of 10KΩ as shown in FIG. 2, etc.).

The first capacitor is connected between the voltage input terminal $V_{in}$ and ground PWRGND (e.g., with a capacitance of 2.2 microfarads (μF) as shown in FIG. 2, etc.).

The first transistor, the second transistor, and the third transistor comprise NPN (Negative-Positive-Negative) transistors. FIG. 2 shows that the transistor model is NSS60201LT1G. As a matter of course, in practice the transistors are not limited to this transistor model NS60201LT1G. The transistors function as electronic switches in the circuit. Any electronic device that can act as a switch is applicable for embodiments disclosed herein, e.g., field-effect transistors, etc.

Furthermore, the values (e.g., resistance, capacitance, etc.) of the components shown in FIG. 2 may be changed according to actual needs for the circuit. In this illustrated embodiment shown in FIG. 2, a thermostat integrated with Wi-Fi functions is given as an example. Because the values of the components are not the focus of the protection of the disclosure, they will not be discussed in detail herein.

Figure 3:
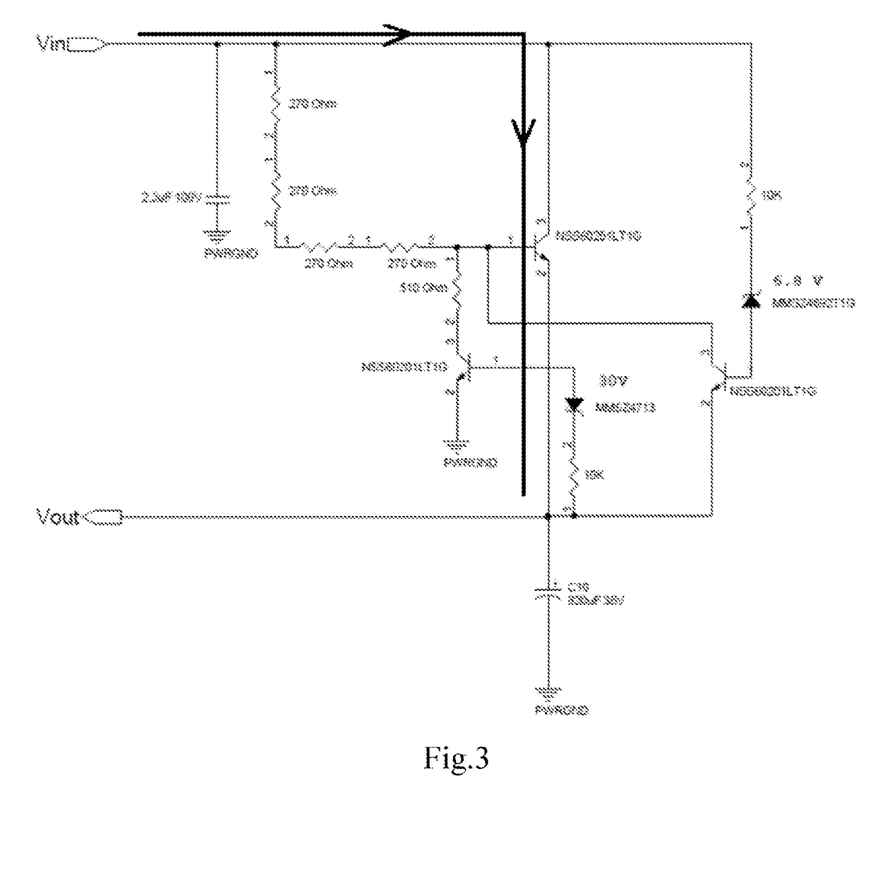
FIG. 3 shows a fast charge path of the DC voltage-limiting circuit shown in FIG. 2.

The DC voltage-limiting circuit in FIG. 2 includes two charge paths for the capacitor and one charge preventing path for the capacitor. Details are given below:

When $V_{in}-V_{out}<7V$, the fast charge path is selected for the circuit, and the charging current is in the direction indicated by the arrow in FIG. 3.

Figure 4:
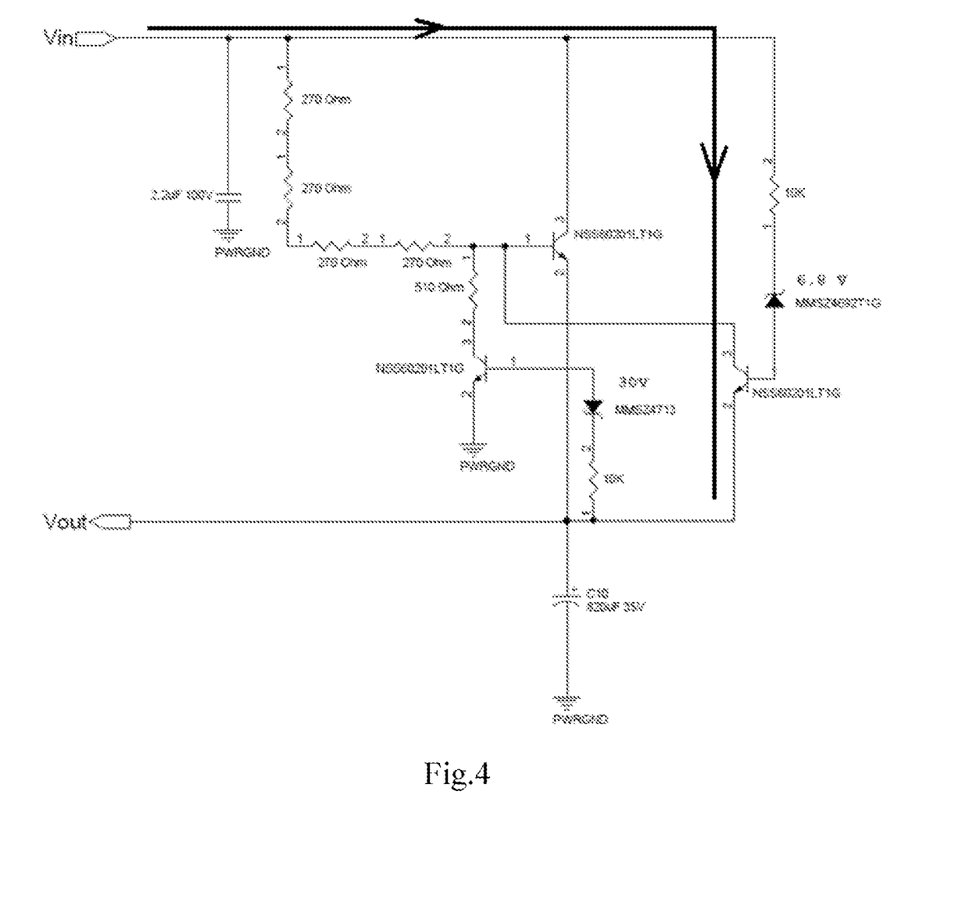
FIG. 4 shows a slow charge path of the DC voltage-limiting circuit shown in FIG. 2.

When $V_{in}-V_{out}>=7V$, the first voltage regulator is on, the slow charge path is selected for the circuit, thereby protecting the first transistor in the fast charge path, and the charging current is in the direction indicated by the arrow in FIG. 4. "Slow" is a relative concept here as opposed to the fast charge path shown in FIG. 3.

Figure 5:
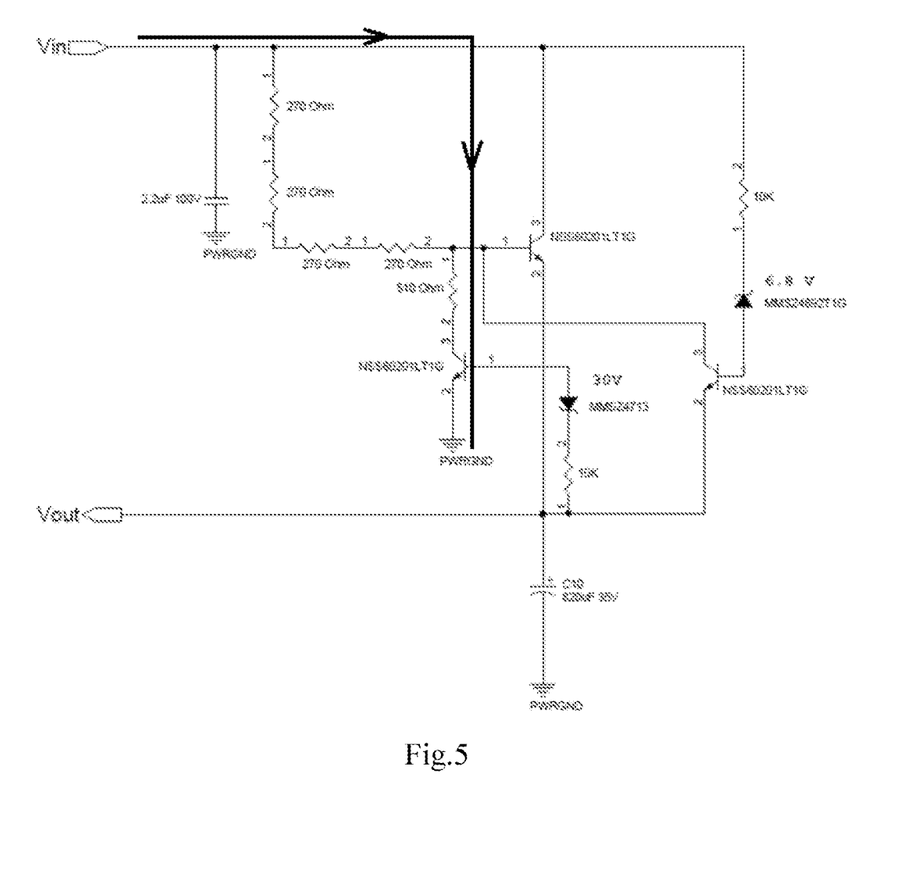
FIG. 5 shows a charge preventing path for the capacitor of the DC voltage-limiting circuit shown in FIG. 2.

When $V_{out}>=31V$, the second voltage regulator is on, the capacitor is prevented from being charged, and $V_{out}$ remains at 31V. The charge preventing path for the capacitor is indicated by the arrow in FIG. 5. If electricity is consumed at $V_{out}$, the steps of FIGS. 3, 4 and 5 are repeated automatically.

In the example above, the fast charge path is selected for the circuit when $V_{in}-V_{out}<7V$, and the slow charge path is selected for the circuit when $V_{in}-V_{out}>=7V$. In another example, the fast charge path is selected for the circuit when $V_{in}-V_{out}=<7V$, and the slow charge path is selected for the circuit when $V_{in}-V_{out}>7V$.

Exemplary embodiments of the present disclosure also provide electronic devices as shown in FIG. 2. In an exemplary embodiment, the electronic device includes the DC voltage-limiting circuit described above, and further includes a second capacitor C1 connected between the voltage output terminal $V_{out}$ and ground PWRGND. Because it is desired that the second capacitor C1 has a high capacitance, it is preferably a polar capacitor. The capacitance shown in FIG. 2 is 820 microfarads (μF).

As shown in FIG. 1, the electronic device may further include an AC-to-DC bridge rectifier and a DC voltage step-down convertor (a BUCK circuit). The bridge rectifier is located before the DC voltage-limiting circuit. The BUCK circuit is located after the DC voltage-limiting circuit. The voltage output terminal of the bridge rectifier is the voltage input terminal of the DC voltage-limiting circuit. The voltage output terminal of the DC voltage-limiting circuit is the voltage input terminal of the BUCK circuit.

The rectifier bridge has two terminals. A first terminal is connected to a live wire R. A second terminal is connected to a neutral wire C.

As discussed above, in the prior art, the second terminal of the bridge rectifier is connected directly to the neutral wire C. But in exemplary embodiments of the present disclosure, the second terminal of the bridge rectifier is connected to the neutral wire via two branches. One branch includes the second terminal connecting directly to the neutral wire C. The other branch includes the second terminal connecting to the neutral wire C via a load. This is unique in that the high electricity consumption required by the large number of function models of the electric device is met.

A thermostat containing the DC voltage-limiting circuit described above according to an embodiment of the present disclosure is described below. As shown in FIG. 1, the thermostat includes a bridge rectifier, including a first terminal and a second terminal. The first terminal is connected to a live wire R. The second terminal is connected to a neutral wire C via two branches. One branch includes the second terminal connecting to the neutral wire C. The other branch includes the second terminal connecting to the neutral wire C via a load. The voltage input terminal of the DC voltage-limiting circuit is a voltage output terminal of the bridge rectifier.

The thermostat also includes a second capacitor connected between the voltage output terminal of the DC voltage-limiting circuit and ground. The thermostat further includes a BUCK circuit having a voltage input terminal being the voltage output terminal of the DC voltage-limiting circuit. In addition, the thermostat may include a temperature sensor, a humidity sensor, a Wi-Fi module, etc.

Applying the DC voltage-limiting circuit provided by exemplary embodiments described herein to a thermostat can bring the following beneficial effects: (1) adaptable to a wide input voltage, such as a DC range 25VDC-42VDC; (2) supporting a larger voltage drop; (3) provided with fast charge and slow charge paths, suitable for high input and low input currents; (4) without high-frequency interference for the circuit, and with low noise; and/or (5) design flexibility, supporting a variety of voltage-limiting designs by changing the voltage regulator diodes.

As compared with the voltage dividing resistor based method, the DC voltage-limiting circuit provided by exemplary embodiments of the present disclosure may have the following advantages: (1) adaptable to a wide input voltage; (2) low power consumption by the circuit itself; and/or (3) design flexibility.

As compared with the voltage regulator diode based method, the DC voltage-limiting circuit provided by exemplary embodiments described herein may have the following advantages: (1) a wide input voltage; and/or (2) low power consumption by the circuit itself.

In exemplary embodiments, a large capacitor has been replaced with a small capacity due to limited space and mechanical packaging constraints. Though a large capacitor may be preferable because of the ability to supply power to a Wi-Fi radio in a situation in which the capacitor is charged by power stealing, there may not be enough space or room for the large capacitor. Therefore, exemplary embodiments disclosed herein employ a smaller, lower rated voltage capacitor and a circuit. The circuit will fast charge the capacitor if the voltage across the circuit is less than 7 volts. If the voltage across the circuit is greater than 7 volts but less than 31 volts, the circuit uses a different path and a slower rate to charge the capacitor. And, when the voltage across the circuit exceeds 31 volts, the circuit stops charging the capacitor. Thus, the circuit limits the input voltage to the smaller, lower rated voltage capacitor.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances. Whether or not modified by the term "about", the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A DC voltage-limiting circuit comprising:
a first transistor connected between a voltage input terminal and a voltage output terminal, the first transistor having a collector connected to the voltage input terminal, an emitter connected to the voltage output terminal, and a base connected to the voltage input terminal via a first resistor;
a second transistor having a base connected to the voltage input terminal via a first voltage regulator and a second resistor, a collector connected to the base of the first transistor, and an emitter connected to the voltage output terminal; and
a third transistor having a collector connected to the base of the first transistor via a third resistor, an emitter grounded, and a base connected to the voltage output terminal via a second voltage regulator and a fourth resistor.

2. The DC voltage-limiting circuit of claim 1, wherein:
the first resistor comprises at least two sub-resistors; and
a sum of the resistances of the sub-resistors is equal to the resistance of the first resistor.

3. The DC voltage-limiting circuit of claim 2, wherein the first resistor comprises four sub-resistors connected in series.

4. The DC voltage-limiting circuit of claim 1, wherein the DC voltage-limiting circuit further comprises a first capacitor connected between the voltage input terminal and ground.

5. The DC voltage-limiting circuit of claim 1, wherein:
the first and second voltage regulators comprise zener diode voltage regulators; and
the first transistor, the second transistor, and the third transistor comprise NPN (Negative-Positive-Negative) transistors.

6. The DC voltage-limiting circuit of claim 5, wherein:
the first voltage regulator comprises a zener diode voltage regulator with a voltage of about 6.8 volts;
the second voltage regulator comprises a zener diode voltage regulator with a voltage of about 30 volts;
the first resistor comprises four resistors connected in series each having a resistance of about 270 ohms;
the second resistor has a resistance of about 10 kiloohms;
the third resistor has a resistance of about 510 ohms; and
the fourth resistor has a resistance of about 10 kiloohms.
the DC voltage-limiting circuit further comprises a first capacitor connected between the voltage input terminal and ground; and
the first capacitor having a capacitance of about 2.2 microfarads.

7. An electronic device comprising the DC voltage-limiting circuit of claim 1 and a second capacitor connected between the voltage output terminal and ground.

8. The electronic device of claim 7, wherein the DC voltage-limiting circuit includes:
a first path for charging the second capacitor;
a second path for charging the second capacitor more slowly than the first path; and
a third path for preventing charging of the second capacitor.

9. The electronic device of claim 8, wherein:
the first path is selected for charging the second capacitor when a voltage across the DC voltage-limiting circuit is less than a first predetermined amount;
the first voltage regulator is on and the second path is selected for charging the second capacitor when a voltage across the DC voltage-limiting circuit is greater than the first predetermined amount but less than a second predetermined amount; and
the second voltage regulator is on and the third path is selected for preventing charging of the second capacitor when a voltage across the DC voltage-limiting circuit is greater than or equal to the second predetermined amount.

10. The electronic device of claim 7, wherein the DC voltage-limiting circuit includes:
a fast charge path for charging the second capacitor when a voltage across the DC voltage-limiting circuit is less than a first predetermined amount;
a slow charge path for charging the second capacitor more slowly than the fast charge path to thereby protect the first transistor in the fast charge path when a voltage across the DC voltage-limiting circuit is greater than the first predetermined amount but less than a second predetermined amount; and
a charge preventing path for preventing charging of the second capacitor when a voltage across the DC voltage-limiting circuit is greater than or equal to the second predetermined amount.

11. The electronic device of claim 10, wherein:
the first predetermined amount is 7 volts; and the
the second predetermined amount is 31 volts.

12. The electronic device of claim 7, wherein the electronic device further comprises:
a bridge rectifier before the DC voltage-limiting circuit; and
a BUCK circuit after the DC voltage-limiting circuit;
wherein:
the BUCK circuit is a voltage step-down converter circuit;
the bridge rectifier has a voltage output terminal being the voltage input terminal of the DC voltage-limiting circuit; and
the BUCK circuit has a voltage input terminal being the voltage output terminal of the DC voltage-limiting circuit.

13. The electronic device of claim 12, wherein:
the bridge rectifier comprises a first terminal and a second terminal;
the first terminal is connected to a live wire; and
the second terminal is connected to a neutral wire.

14. The electronic device of claim 13, wherein the second terminal is connected to the neutral wire via two branches, one of which is the second terminal connecting to the neutral wire, the other is the second terminal connecting to the neutral wire via a load.

15. The electronic device of claim 7, wherein the second capacitor comprises a polar capacitor having a capacitance of about 820 microfarads (μF).

16. The electronic device of claim 7, wherein the electronic device is a thermostat.

17. A thermostat comprising the DC voltage-limiting circuit of claim 1, the thermostat further comprising:
- a bridge rectifier including a first terminal and a second terminal, wherein the first terminal is connected to a live wire, the second terminal is connected to a neutral wire via two branches, one of which is the second terminal connecting to the neutral wire, the other is the second terminal connecting to the neutral wire via a load, the voltage input terminal of the DC voltage-limiting circuit being a voltage output terminal of the bridge rectifier;
- a second capacitor, connected between the voltage output terminal of the DC voltage-limiting circuit and ground; and
- a BUCK circuit, having a voltage input terminal being the voltage output terminal of the DC voltage-limiting circuit.

18. An electronic device comprising:
a DC voltage-limiting circuit including:
- a first transistor connected between a voltage input terminal and a voltage output terminal, the first transistor having a collector connected to the voltage input terminal, an emitter connected to the voltage output terminal, and a base connected to the voltage input terminal via a first resistor;
- a second transistor having a base connected to the voltage input terminal via a first voltage regulator and a second resistor, a collector connected to the base of the first transistor, and an emitter connected to the voltage output terminal;
- a third transistor having a collector connected to the base of the first transistor via a third resistor, an emitter grounded, and a base connected to the voltage output terminal via a second voltage regulator and a fourth resistor; and
- a first capacitor connected between the voltage input terminal and ground;

wherein the electronic device further comprises a second capacitor connected between the voltage output terminal and ground, a bridge rectifier before the DC voltage-limiting circuit; and a BUCK circuit after the DC voltage-limiting circuit;

wherein the BUCK circuit is a voltage step-down converter circuit, the bridge rectifier has a voltage output terminal being the voltage input terminal of the DC voltage-limiting circuit, and the BUCK circuit has a voltage input terminal being the voltage output terminal of the DC voltage-limiting circuit; and wherein the DC voltage-limiting circuit includes a first path for charging the second capacitor, a second path for charging the second capacitor more slowly than the first path, and a third path for preventing charging of the second capacitor.

19. The electronic device of claim 18, wherein:
the first path is selected for charging the second capacitor when a voltage across the DC voltage-limiting circuit is less than a first predetermined amount;
the first voltage regulator is on and the second path is selected for charging the second capacitor when a voltage across the DC voltage-limiting circuit is greater than the first predetermined amount but less than a second predetermined amount; and
the second voltage regulator is on and the third path is selected for preventing charging of the second capacitor when a voltage across the DC voltage-limiting circuit is greater than or equal to the second predetermined amount.

20. A thermostat comprising:
a DC voltage-limiting circuit including:
- a first transistor connected between a voltage input terminal and a voltage output terminal, the first transistor having a collector connected to the voltage input terminal, an emitter connected to the voltage output terminal, and a base connected to the voltage input terminal via a first resistor;
- a second transistor having a base connected to the voltage input terminal via a first voltage regulator and a second resistor, a collector connected to the base of the first transistor, and an emitter connected to the voltage output terminal;
- a third transistor having a collector connected to the base of the first transistor via a third resistor, an emitter grounded, and a base connected to the voltage output terminal via a second voltage regulator and a fourth resistor; and
- a first capacitor connected between the voltage input terminal and ground;

wherein the thermostat further comprises a second capacitor connected between the voltage output terminal and ground, a bridge rectifier before the DC voltage-limiting circuit; and a BUCK circuit after the DC voltage-limiting circuit;

wherein the BUCK circuit is a voltage step-down converter circuit, the bridge rectifier has a voltage output terminal being the voltage input terminal of the DC voltage-limiting circuit, and the BUCK circuit has a voltage input terminal being the voltage output terminal of the DC voltage-limiting circuit;

wherein the DC voltage-limiting circuit includes:
- a fast charge path for charging the second capacitor when a voltage across the DC voltage-limiting circuit is less than a first predetermined amount;
- a slow charge path for charging the second capacitor more slowly than the fast charge path to thereby protect the first transistor in the fast charge path when a voltage across the DC voltage-limiting circuit is greater than the first predetermined amount but less than a second predetermined amount; and
- a charge preventing path for preventing charging of the second capacitor when a voltage across the DC voltage-limiting circuit is greater than or equal to the second predetermined amount.

* * * * *